(12) United States Patent
Ketonen

(10) Patent No.: US 9,813,930 B1
(45) Date of Patent: Nov. 7, 2017

(54) METHOD AND APPARATUS FOR INTEGRATING ACTIVE TEST CAPABILITY TO A WIRELESS ACCESS POINT OR BASE STATION

(71) Applicant: 7Signal Solutions, Inc., Akron, OH (US)

(72) Inventor: Veli-Pekka Ketonen, Aurora, OH (US)

(73) Assignee: 7Signal Solutions, Inc., Akron, OH (US)

( * ) Notice: Subject to any disclaimer, the term of this patent is extended or adjusted under 35 U.S.C. 154(b) by 27 days.

(21) Appl. No.: 14/804,671

(22) Filed: Jul. 21, 2015

Related U.S. Application Data

(60) Provisional application No. 62/026,871, filed on Jul. 21, 2014.

(51) Int. Cl.
*H04W 24/10* (2009.01)
*H04B 17/00* (2015.01)

(52) U.S. Cl.
CPC ........ *H04W 24/10* (2013.01); *H04B 17/0085* (2013.01)

(58) Field of Classification Search
CPC .......... H04B 3/46; H04B 1/0475; H04B 1/10; H04B 1/1018; H04B 10/697; H04B 14/046; H04B 15/00; H04B 1/1027; H04B 7/15564; H04B 17/00; H04B 17/0085; H04B 17/16; H04B 17/19; H04H 40/72; H04J 11/0023; H04L 1/242; H04L 1/243; H04L 12/26; H04L 43/00; H04L 43/50; H04L 25/085; H04L 27/2691; H04W 28/048; H04W 24/00; H04W 24/06; H04W 24/08
See application file for complete search history.

(56) References Cited

U.S. PATENT DOCUMENTS

| | | | |
|---|---|---|---|
| 5,189,734 | A | 2/1993 | Bailey et al. |
| 5,818,832 | A | 10/1998 | McCallister |
| 6,122,505 | A | 9/2000 | Genell et al. |
| 6,252,942 | B1 | 6/2001 | Zoiss et al. |
| 6,253,060 | B1 | 6/2001 | Komara et al. |
| 6,377,806 | B1 | 4/2002 | Tokuyoshi |

(Continued)

FOREIGN PATENT DOCUMENTS

| | | |
|---|---|---|
| EP | 1187367 A2 | 3/2002 |
| FI | 20031803 A | 2/2008 |
| WO | 2008039962 A | 4/2008 |

OTHER PUBLICATIONS

Finnish Search Report, Application No. 20070604, dated Apr. 25, 2008.

(Continued)

*Primary Examiner* — Benjamin H Elliott, IV
(74) *Attorney, Agent, or Firm* — MacMillan, Sobanski & Todd, LLC

(57) ABSTRACT

A method and apparatus for service quality monitoring in a wireless network is provided. The network has both wired and wireless connections, and has at least one access point capable of providing wireless connectivity to client devices. Wireless connectivity is provided to client devices from the access point with at least one client-serving radio transceiver. Radio test signals are generated for network testing from a testing transceiver at the access point.

22 Claims, 4 Drawing Sheets

(56) References Cited

U.S. PATENT DOCUMENTS

| | | |
|---|---|---|
| 6,714,779 B2 | 3/2004 | Hall et al. |
| 7,096,160 B2 | 8/2006 | Skidmore et al. |
| 7,113,782 B2 | 9/2006 | Lucidarme |
| 7,257,107 B2 | 8/2007 | Swier, Jr. et al. |
| 7,339,891 B2 | 3/2008 | Binder et al. |
| 7,359,679 B2 | 4/2008 | King et al. |
| 7,394,796 B2 | 7/2008 | Thermond et al. |
| 7,437,176 B1 | 10/2008 | Ribas et al. |
| 7,539,489 B1 | 5/2009 | Alexander |
| 7,596,373 B2 | 9/2009 | McGregor et al. |
| 7,693,093 B2 | 4/2010 | Riedel et al. |
| 7,702,775 B2 | 4/2010 | Kuan et al. |
| 7,852,821 B2 | 12/2010 | Hyon et al. |
| 7,907,908 B2 | 3/2011 | Saitou et al. |
| 7,925,740 B2 | 4/2011 | Nath et al. |
| 8,019,341 B2 | 9/2011 | Falk et al. |
| 8,023,948 B2 | 9/2011 | Han |
| 8,040,835 B2 | 10/2011 | Olson et al. |
| 8,077,662 B2 | 12/2011 | Srinivasan et al. |
| 8,654,660 B2 | 2/2014 | Ketonen |
| 9,083,722 B2 | 7/2015 | Balasubramanian |
| 9,191,226 B2 | 11/2015 | Deshpande et al. |
| 2003/0135762 A1 | 7/2003 | Macaulay |
| 2005/0042581 A1 | 2/2005 | Oh et al. |
| 2005/0265296 A1 | 12/2005 | Zhang et al. |
| 2008/0114580 A1* | 5/2008 | Chin .................. H04B 17/3912 703/13 |
| 2009/0096415 A1 | 4/2009 | Beart et al. |
| 2009/0177420 A1* | 7/2009 | Fournier ............ G01R 31/1272 702/59 |
| 2014/0080480 A1* | 3/2014 | Helm .................. H04B 17/104 455/426.1 |
| 2015/0109941 A1* | 4/2015 | Zhang ................ H04B 17/0085 370/252 |
| 2015/0244604 A1* | 8/2015 | Moreno .............. H04L 43/0882 370/252 |
| 2016/0359717 A1* | 12/2016 | Sheya .................... H04L 43/50 |

OTHER PUBLICATIONS

PCT International Search Report, Application No. PCT/FI2008/050453, dated Nov. 5, 2008.

Wang et al., "Single Antenna Attitude Algorithm for Non-uniform Antenna Gain Patterns", Journal of Spacecraft and Rockets, 2007, vol. 44, No. 1, pp. 221-229.

* cited by examiner

METHOD AND APPARATUS FOR INTEGRATING ACTIVE TEST CAPABILITY TO A WIRELESS ACCESS POINT OR BASE STATION

RELATED APPLICATIONS

This application claims priority from U.S. Provisional Patent Application Ser. No. 62/026,871, filed Jul. 21, 2014, and entitled METHOD AND APPARATUS FOR INTEGRATING ACTIVE TEST CAPABILITY TO A WIRELESS ACCESS POINT OR BASE STATION.

TECHNICAL FIELD

This invention relates to monitoring and quality parameter measurements in wireless networks.

BACKGROUND OF THE INVENTION

In wireless networks it is desirable to ensure good quality for the data traffic in the network. Quality can be verified and efficiently maintained by monitoring the functionalities of the wireless network with appropriate apparatus and procedures. The monitoring of the network reveals whether desired connection or services are available or whether a sufficient quality level for the connection is reached.

It would be advantageous if there could be developed improved systems for assessing end-to-end service quality for large and spread out wireless broadband networks.

SUMMARY OF THE INVENTION

According to this invention there is provided a method for service quality monitoring in a wireless network. The network has both wired and wireless connections, and has at least one access point capable of providing wireless connectivity to client devices. Wireless connectivity is provided to client devices from the access point with at least one client-serving radio transceiver. Radio test signals are generated for network testing from a testing transceiver at the access point.

In another embodiment the radio test signals are generated for network testing from an interface at the access point.

According to this invention, there is also provided a method for service quality monitoring in a wireless network. The network has both wired and wireless connections. The network has one access point and a second access point, each providing wireless connectivity to client devices. Client-serving radio signals are broadcast from the one access point. Test signals are generated from a testing transmitter positioned at the one access point to assess service quality of client service provided by the second access point. Test signals are generated from a second testing transmitter positioned at the second access point to assess service quality of client service provided by the one access point.

According to this invention, there is also provided a method for service quality monitoring in a wireless network having wireless traffic, the network having both wired and wireless connections. The network has at least one access point capable of providing wireless connectivity to client devices. Wireless connectivity is provided to client devices from the access point with at least one client-serving radio transceiver. Test signals are generated for network testing from a testing transceiver. The test signal off-band noise and interference level are attenuated, with the attenuation being sufficient to reduce the off-band noise and interference to the same level or below the level of noise and interference received from the wireless traffic in the network.

According to this invention there is also provided apparatus for service quality monitoring in a wireless network, the network having both wired and wireless connections. The apparatus includes an access point for providing wireless connectivity to client devices. The access point is configured to broadcast client-serving radio signals from the access point. A testing transmitter is capable of generating test signals within the network to assess service quality of the network. The test signals are transmitted by an antenna that is not directly connected to the access point and is connected to the access point through RF connectivity. The antenna is spaced apart from the access point by a distance sufficient to cause attenuation of the test signals, with the attenuation being sufficient to significantly reduce interference between the client-serving radio signals and the test signals broadcast by the antenna.

Various advantages of this invention will become apparent to those skilled in the art from the following detailed description of the preferred embodiment, when read in light of the accompanying drawings.

DETAILED DESCRIPTION OF THE INVENTION

Figure 1:
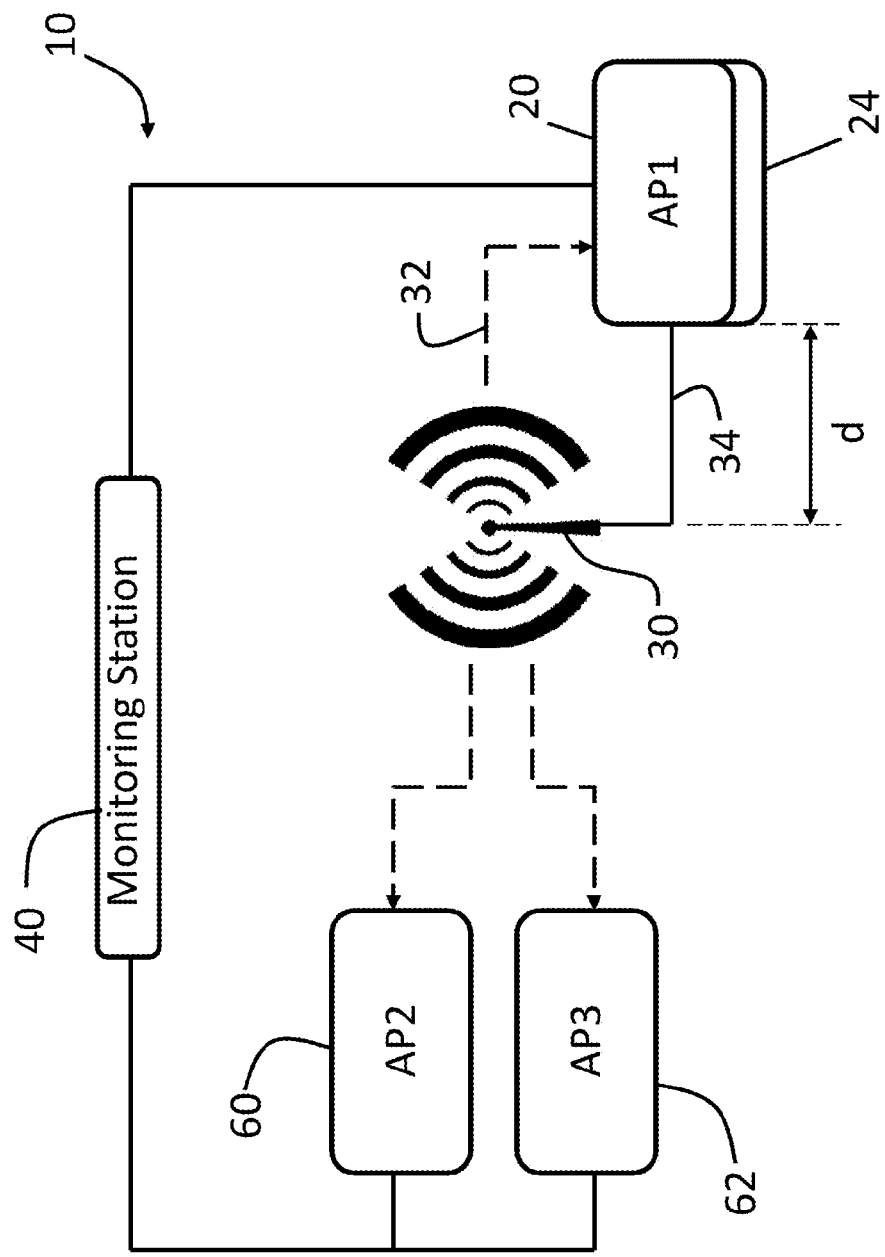
FIG. 1 is a schematic view of a wireless network using an antenna for broadcasting test signals.

The quality of the wireless service in wireless networks can be degraded or compromised by a number of factors, including the addition of new technology and applications, the addition of new hardware to the network, and demands for increased capacity. One challenging wireless application is Voice over IP (VoIP) over WiFi (wireless fidelity), which is also called VoFi. Other demanding applications include video streaming, video conferences and a so-called triple play functionality which means video, voice call and file transfer simultaneously over packet data network. All of these factors can affect the quality of the wireless service.

Wireless networks also regularly suffer from technology related issues significantly impacting to end user experience. Certain models or versions of wireless network equipment and user equipment may be incompatible. The number of possible combinations of equipment in wireless settings is so high that testing everything against each other is impossible task for equipment manufacturers. Incompatibility problems occur when users access and use wireless services and the network paths selected involve incompatible equipment. Another typical phenomenon in wireless networks is "sleeping cell" syndrome. This means that cell may be visible to end users, but cannot provide any traffic or service. This may be related to a fault in the equipment, where each software version may behave differently in this sense. When a user in a network desires a connection to a desired additional network, or to users or servers offering services to the end user, the true end user experience depends on the full end-to-end functionality of the network, including both hardware and wireless connections and all related wired infrastructure in the path selected within the wireless network.

Quality monitoring of local area networks, where data is transferred between desired servers and desired end user computers, can include various data transfer protocols. In determining the service quality it is not sufficient to merely monitor the radio interface, and it is also not sufficient to merely monitor the wired connection. Full visibility to true service quality requires complete end-to-end monitoring. In some cases service quality monitoring includes the function of detecting or preventing wireless intrusion occurrences. Wireless access points are controlled and managed by a controller or management server. These services allow changing the mode and configuration of each access point. One of the modes may be a monitoring station which observes and measures offered network services.

The method, apparatus and system disclosed in this specification relates to quality monitoring that allows integrating wireless access points and active monitoring sensors into one common unit. The network includes access points (or base stations) providing wireless connection to clients' end user devices. For purposes of this specification the access point can be in the form of a base station. It should be understood that a monitoring device can include the function of gathering data from various sources and storing or reporting the data to assess the service quality of the network. Further, the monitoring device can include the function of active testing by sending out test signals to determine the service quality of the network. Thus, the monitoring device includes both a data gathering function and a testing function.

In an advantageous configuration, the method, apparatus and system consists of the following elements. Positioned within the network is an access point or base station which offers connectivity for client devices. The access point has one additional radio transceiver which can be used for measuring or testing service quality offered by the same or other access points or base stations in the area. A test end point is present, and this is reached by the testing transceiver while the transceiver performs active, synthetic transactions to measure network service quality. The test end point may be a dedicated device like a test server, another access point, any other server or service accessible by the testing transceiver, such as a web site or application server or device in a data center. A test server can be used to collect and store the data from the measurements. The test server can also post-process the collected information for analytics, alarms, reporting or automated configuration change purposes. A separate reporting server or suite can be advantageous for post processing purposes. This invention may be applied in multiple ways and is not limited to this presented typical advantageous configuration.

During the service quality monitoring process the test signals are routed along various paths. In one embodiment of the invention, the method further comprises defining a monitoring device (i.e., test signal generating and receiving apparatus, or merely a test signal generating means or testing transmitter) as a starting point of a test route and the same monitoring device as an ending point of the route. It is to be understood that the monitoring device can be viewed as a subsystem of the access point. In another embodiment the monitoring device is defined as a starting point of a route and another monitoring device as an ending point of the route. The system can define a monitoring device as a starting point of a route and a test server as an ending point of the route, or a test server as a starting point of a route and a monitoring device as an ending point of the route. Further, the system can define a monitoring device as a starting point of a route and a reporting server as an ending point of the route, or a reporting server as a starting point of a route and a monitoring device as an ending point of the route.

Wireless local area networks (WLAN) access points usually have two radio modules, but are not limited to this. At times, one additional radio is included for passive monitoring purposes. Typically two of the radio modules serve client traffic, one radio at the 2.4 GHz band and one at the 5 GHz band. Other frequencies can also be used. Since radios operate at frequencies which have significant separation, there is little significant interference with each other. Further, the access point can be a base station, which is the term used in connection with wide area or cellular networks.

When the access point also includes a monitoring functionality, a third radio may be used for monitoring purposes. For example, the third radio may be configured to perform a spectrum analysis, or may be set up to observe traffic. It would be advantageous to use the third radio to send end-to-end test signals to assess the service quality of the network, but this may result in interferences with other operations of the access point. This interference is caused by wide band noise or interference. For the sake of clarity, in this conjunction noise and interference are considered having similar impact on the transceiver operation. Even though only one term may be mentioned, both aspects are considered to be covered. Generally major part of the transmitter energy is within the modulation band width, it also significantly leaks over to other frequencies. In a case where multiple transceivers use the same frequency, radio interface may have built in capabilities to prevent simultaneous transmission and coordinate access to channels. When nearby transceivers use different channels, this coordination does not take place and transceivers may end up transmitting at the same time. This causes the wide band noise or interference to enter another transceiver's receiver at the same time as it is receiving actual end user client device data. Since the transceivers are so close to each other, this leakage will reduce receiver sensitivity and its capability to receive actual client traffic. This leads to reduced coverage area, intermittent connectivity problems and a high amount of retransmissions from client devices towards the access point or base station.

For this reason, actively transmitting monitoring devices in wireless network systems conventionally have been configured as separate units at a considerable distance to the nearest access point. By positioning actively transmitting monitoring devices at an access point that is positioned at a sufficient distance from the primary or client serving access point, the wide band noise from the monitoring device is attenuated enough so that it does not interfere with the operation of the client serving access point or client device receiver.

The need for using a separate access point when making active service quality measurements can be eliminated by using a monitoring capability within the client serving access point while using a connected but remotely placed test signal transmitting and receiving device, such as an antenna or radio module, for transmitting and/or receiving test signals for the service quality monitoring.

The access point including the third or additional, non client serving radio can be positioned any place in the network. In a particular embodiment, the monitoring device or capability is associated with and connected to a primary or client serving access point, with the third radio optionally being powered from the access point. More particularly, the third radio can be positioned at the primary or client serving access point.

As shown in FIG. 1, a wireless network is indicated at 10. The network allows client users to access servers, the Internet and other client users. Positioned within the wireless network 10 is a primary, client serving access point AP1, indicated at 20 in FIG. 1. The primary access point 20 includes first and second radios serving clients by sending and receiving wireless signals in two different frequencies.

Positioned at the access point is a monitoring device 24. The monitoring device 24 includes a third radio for generating test signals for testing various routes or paths within the network 10. Further, the monitoring device 24 includes a data gathering capability.

Also positioned in the network is a radio antenna 30. The radio antenna 30 is connected to a third radio in the monitoring device 24, which is positioned within the primary client serving access point 20. The connection from the monitoring device 24 (and the third radio) to the antenna 30 can be by any suitable mechanism. In one embodiment, the connection is via an RF signal transmitted between the monitoring device and the antenna 30, as shown at 32 in FIG. 1. In another embodiment, the connection is via a hardwire connection, as shown at 34 in FIG. 1. Other connections can be used in alternative embodiments.

The radio antenna 30 can be either a directional radio antenna or a non-directional radio antenna. Optionally, the beam of the antenna 30 can be controlled so that both horizontal and vertical rotation is possible. Also, optionally, the antenna 30 can be a configured to broadcast and/or receive in a focused beam arrangement. The third radio is configured to send test signals throughout the network 10 to monitor the service quality of the network. The data received from the monitoring device 24 can be received and assessed by the monitoring station 40.

The antenna 30 is positioned at a distance d from the monitoring device 24 and the primary access point 20. The distance d is sufficient to allow the signals from the antenna 30 to dissipate to minimize or eliminate interference with the client user traffic to and from the primary access point 20. By positioning the antenna only at a distance d from the primary client serving access point 20, there is no need to position the complete third radio and antenna itself at a distance from the primary client serving access point 20. The distance d in FIG. 1 is about 5 feet, but can be any suitable distance as described below. Distance depends on the characteristics of the access point signal.

The antenna 30 is positioned away from the access point 20 a distance adequate to avoid significant interference with the first and second radios serving client traffic at the client serving access point 20. In one embodiment this distance is within the range of from about 3 feet to about 6 feet. In other embodiments this distance is less than about 3 feet or more than about 6 feet. In another embodiment the distance is within the range of from about 2 feet to about 10 feet.

One primary benefit of separating the antenna 30 from the monitoring device 24 and the third radio is that there is no need for a separate access point or other device with computer like capabilities at the location of the antenna. All that is required is a connection between the monitoring device 24 and the antenna. The other primary benefit is that the monitoring device 24 and third radio can be located at the primary client serving access point 20 while still minimizing or eliminating the interference with the signals from the first and second radios.

Figure 2:
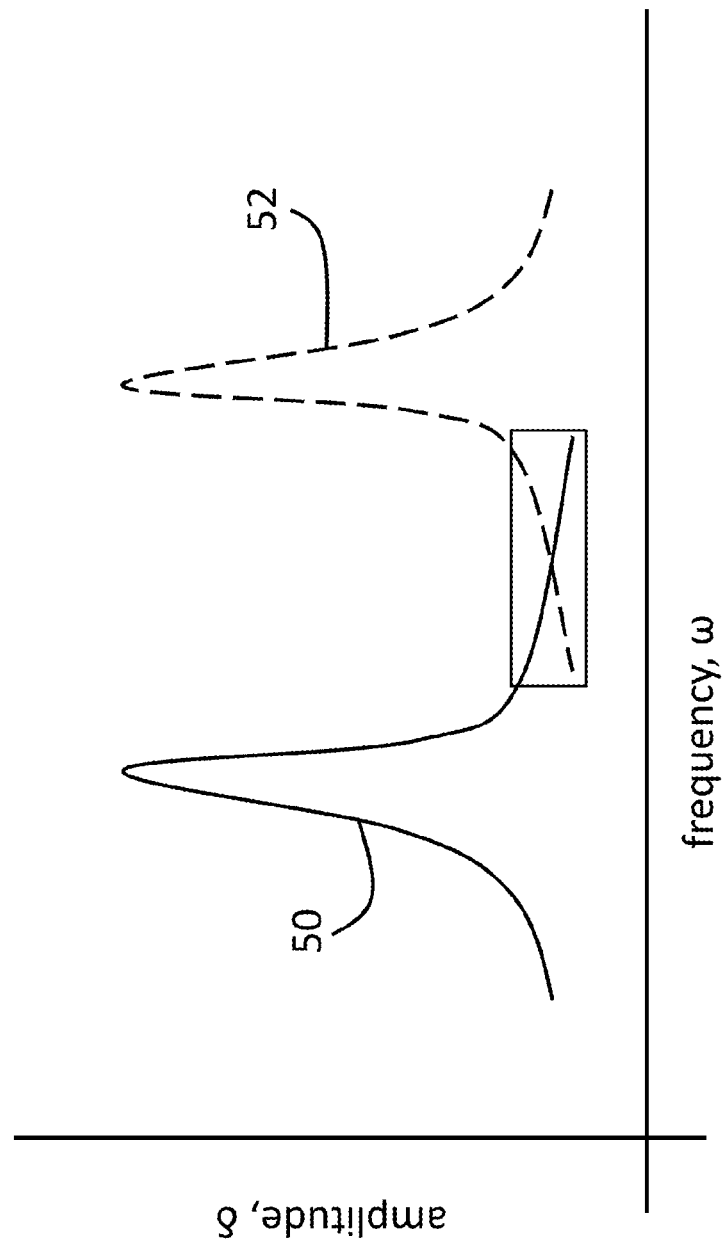
FIG. 2 is a schematic graph showing interference between signals from a client-serving radio and signals from a test radio.

FIG. 2 represents a system in which a third radio is positioned at the client serving access point 20, with the third radio sending and receiving test signals to and from the access point 20. As shown in FIG. 2, the radio spectrum of the signals from the first radio at the client serving access point 20 is shown at 50. The radio spectrum of the test from the third radio, where the test signals are broadcast from the primary client serving access point 20, are indicated at 52. It can be seen that radio spectrum 50 overlaps radio spectrum 52, and that there could be interference between the first radio signals and the third radio test signals. A similar interference situation could exist with the signals from the second radio.

Referring back to FIG. 1 the network 10 can include additional access points, such as AP2 indicated at 60 and AP3 indicated at 62. If the antenna 30 is appropriately placed with respect to AP2 60 and AP3 62, the test signals generated from the third radio at the monitoring device 24, and broadcast from the antenna 30, can be directed to test the AP2 and AP3 access points 60, 62. The distance between the antenna 30 and either of the AP2 and the AP3 access points must be sufficient to avoid interference with the client serving signals from the AP2 and AP3 access points. Thus it can be seen that the monitoring device 24 and antenna 30 can be used to send test signals and measure service quality for additional access points besides the access point 20 where the third radio is located.

In connection with this specification, the term "active testing" means that the radio behaves like clients connecting to access points and testing radio, and the test signals are directed through an end-to-end connection towards certain server applications or test end points in the network. These test signals may be called synthetic transactions as well. In active testing the test signals are proactively transmitted over various routes so that problems are discovered by the testing process, and corrected, before they are detected by a client user experiencing a failure of a wireless connection or a poor quality of service.

One of the aspects of the system is that the monitoring device includes testing over a multiplicity of different routes in advance to detect problem connections. In order to mimic possible uses of client devices in the wireless network, the tests must include testing routes that reach a test end point over the Internet or Local Area Network. E.g., the client may wish to connect to an end point over the Internet, such as the Wikipedia website, or an external server, such as an external email server, or any other end point reached through the Internet.

The test signals transmitted within the network and the resulting measurements provide information in at least layers L3-L7. Examples of the aspects of the system that can be measured include connection availability, throughput, packet loss, jitter, application load time, and application transactions. Layer 2 aspects that can be measured include but are not limited to radio data rates and radio retry rates. Layer 1 spectrum characteristics can also be measured.

Figure 3:
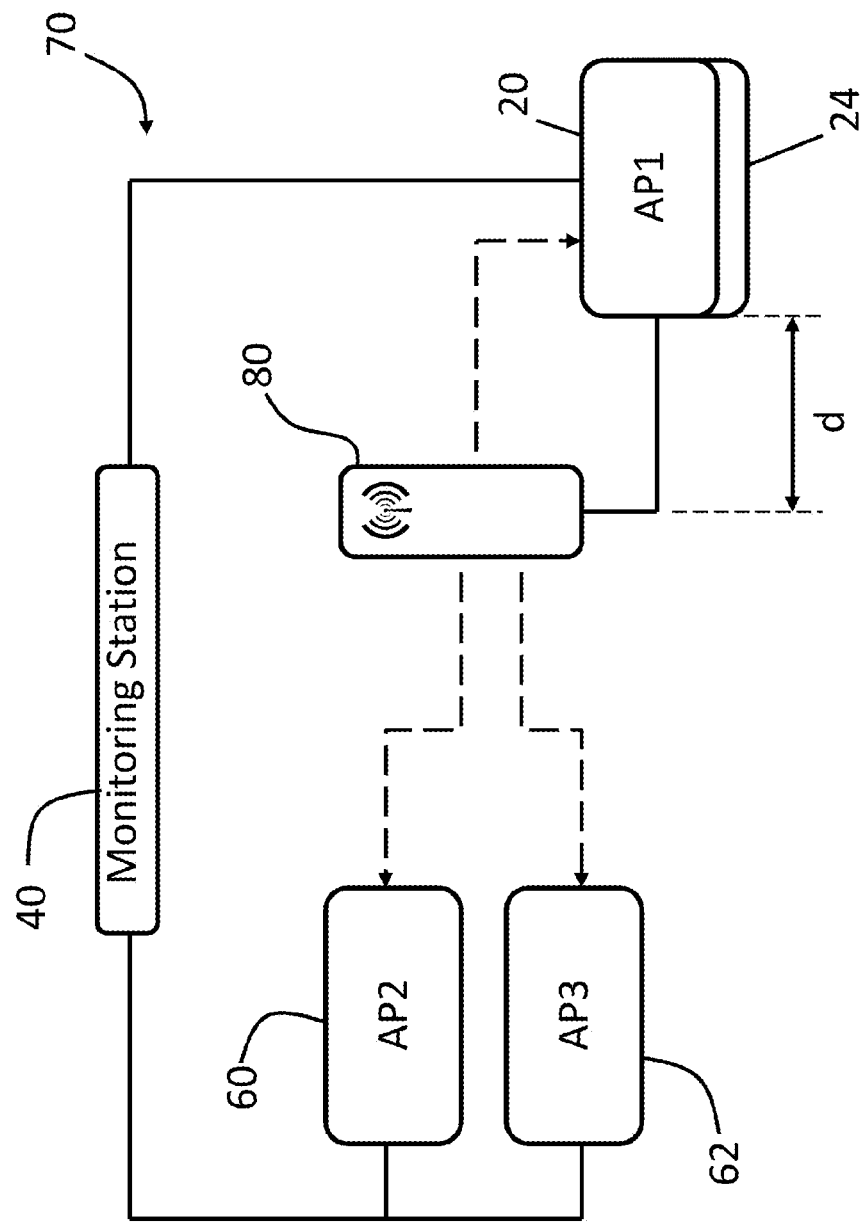
FIG. 3 is a schematic view of a wireless network using a USB WLAN radio adapter for broadcasting test signals.

In another embodiment, as shown in FIG. 3, a network is indicated at 70. The monitoring device 24 includes an associated WLAN client device, such as a USB WLAN radio adapter shown at 80. This radio adapter is positioned at a small distance from access point 20, and is connected to the access point 20 through a USB or similar wired connection. This distance can be from a few inches to tens of feet. The RF signal levels attenuate rapidly when the distance increases. This arrangement allows the wide band noise to attenuate enough for simultaneously operating two or more radios in the same band without significant interference. The central computing module is still within the host access point 20.

Figure 4:
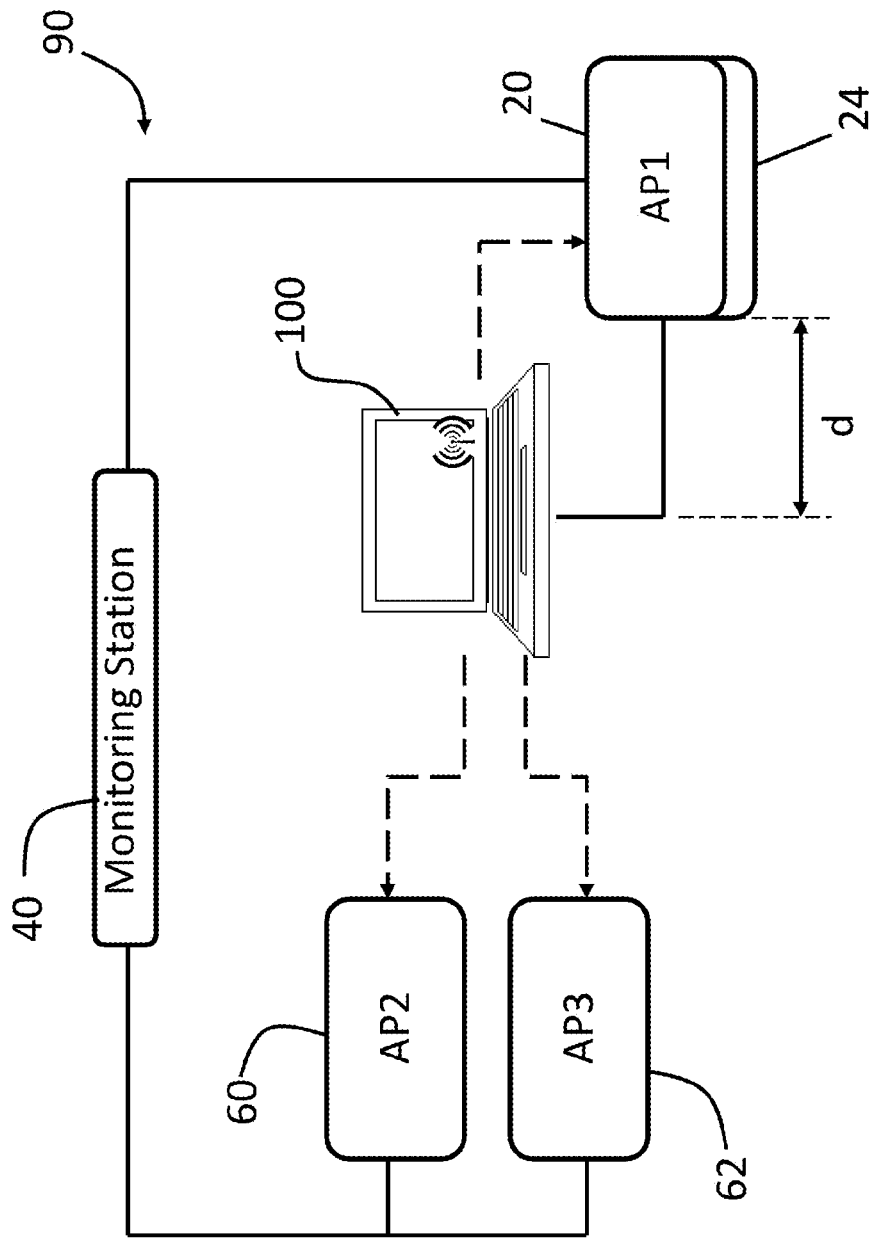
FIG. 4 is schematic view of a wireless network using a computer module with a WLAN radio for broadcasting test signals.

In yet another embodiment, as shown in FIG. 4, the monitoring device 24 is positioned in yet another wireless network 90. The monitoring device 24 includes a mini computer module 100 with a WLAN radio. This device can be located further away from access point 20 than a typical antenna 30. Optionally the access point 20 provides power supply to this computer module 100. The test radio in the computer module 100 may be connected to the access point 20 through Ethernet with Power over Ethernet, or with a USB connection delivering the power. The test radio in the computer module 100 may use LAN/USB for getting control signals and reporting the results. The test radio in the computer module 100 may also operate over the air, getting test profiles over the radio and reporting the results back over the radio.

It can be seen that one the primary thrust of the invention is to physically separate the devices transmitting the test signals from the access point 20 to prevent or minimize interference. While this goal is accomplished as disclosed above by physically separating the transmission of test signals from the first and second radios, the separation of the test signals from the client serving access point can be accomplished in other ways. In one embodiment, the test signals are separated from the client-access point signals by using only distant enough frequencies for the test signals. This allows wide band noise to be reduced enough and not interfere with the client-access point traffic.

In another embodiment, the interference can be eliminated by using a switch to turn on and off both the client-access point signals from the first and second radios in an alternating pattern with the transmission of the test signals from the third radio. Implementing this method may prevent the monitoring device 24 from testing the access point 20, i.e., the location of the monitoring device 24, but the monitoring device 24 could still test nearby access points, such as access points 60 and 62. The testing or service quality monitoring of access point 20 would have to be carried out by a separate monitoring device located at one of the nearby access points, such as access points 60 and 62.

In another embodiment, the interference can be eliminated by using a switch to turn on and off both the client-access point signals from the first and second radios in an alternating pattern with the transmission of the test signals from the third radio. Implementing this method may prevent the monitoring device 24 from testing the access point 20, i.e., the location of the monitoring device 24, but the monitoring device 24 could still test nearby access points, such as access points 60 and 62. The testing or service quality monitoring of access point 20 would have to be carried out by a separate monitoring device located at one of the nearby access points, such as access points 60 or 62.

In yet another embodiment, interference between the test signal transmitter and access point client serving radios can be achieved by designing antennas which offer large enough attenuation to avoid problems caused by wide band noise and simultaneous transmissions. One way to achieve this is to use directional antennas, which are pointing to different directions In another embodiment, the coupling may be reduced by using analog and/or digital cancellation techniques. Client serving access point may subtract the test signal transmission from the RF signals it receives. The same applies to the test transmitter/receiver, which may subtract the access point traffic from the signals it receives. Different analog and digital cancellation techniques are well known and they are not explained here in more detail.

In an additional embodiment, the radio paths used for testing may be be used alternatively as a testing interface or additional dedicated MIMO (Multiple-Input Multiple-Output) stream, a share of multi user MIMO stream or diversity path.

In yet another embodiment generating the radio test signals for network testing is done with different wireless technology than the wireless technology used for connectivity to end user devices from the access point. An example of this is if one of the wireless technologies uses a Bluetooth platform, and one does not.

In a further embodiment the radio test signal impact on the access point operation is reduced by using digital or analog cancelation at the access point receiver. Cancellation circuits operate by adding a 180 degrees phase shifted copy of the signal which is wanted to be removed to the original signal. For example: Presume that the test transceiver sends out a certain test signal to nearby access point. At the same time, this signal is received at the nearby client serving access point transceiver and the test signal interferes with the access point operation. The impact of this test signal on the access point can be reduced by taking a copy of the test signal, phase shifting it by 180 degrees and adding it to the access point transceiver. This substantially reduces the impact of the test signal to the client serving radio transceiver. This operation can be accomplished with analog, digital or by using both technologies simultaneously.

In a further embodiment the radio test signal impact on the access point operation is reduced by using digital or analog cancellation at the access point receiver. Cancellation circuits operate by adding a 180 degrees phase shifted copy of the signal which is wanted to be removed to the original signal. For example: Presume that the test transceiver sends out a certain test signal to nearby access point. At the same time, this signal is received at the nearby client serving access point transceiver and the test signal interferes with the access point operation. The impact of this test signal on the access point can be reduced by taking a copy of the test signal, phase shifting it by 180 degrees and adding it to the access point transceiver. This substantially reduces the impact of the test signal to the client serving radio transceiver. This operation can be accomplished with analog, digital or by using both technologies simultaneously.

In another alternative embodiment the impact of one transceiver transmitter on another transceiver can be reduced or removed by using RF filters. Wide band signal leakage from a transmitter can be reduced or removed by placing an RF filter at the transmitter. The filter must have such characteristics that it attenuates the RF signal on the other used frequencies. This prevents wide band noise or interference leakage to other operating transceiver frequencies. This can be achieved by using band pass, high pass, low pass or band rejection filters appropriately. Filters may also have tuning capability which allows them to pass desired signals optimally while attenuating the undesired signals sufficiently. When multiple radios are operating simultaneously, in optimal configuration they all have RF filters to prevent noise and interference leakage at undesired frequencies.

The method, apparatus and system disclosed in this specification monitors service quality by finding such problems as the location of interfering signal sources, and the bottlenecks of the networks which restrict the service quality. Further the method, apparatus and system enable the monitoring of end-to-end connection routes as experienced by end users.

The results of the monitoring of the service quality can be handled by a reporting server, not shown, that collects the measurement results sent by the monitoring stations. The measurement results can also be transferred via public Internet. The server can be located in premises of a third party and in one example, the third party is a technical support service of the network service. The actual collection of the measurement data is performed by either reporting server or suite. The reporting server or suite can command the monitoring stations to perform predefined measurements. Furthermore, the collected measurement results can further be transmitted to a network administrator, inside or outside a company internal network. Optionally, at least one service quality parameter is calculated from the data resulting from the monitoring device 24.

The principle and mode of operation of this invention have been described in its preferred embodiments. However, it should be noted that this invention may be practiced otherwise than as specifically illustrated and described without departing from its scope.

What is claimed is:

1. A method for service quality monitoring in a wireless network, the network having both wired and wireless connections, the network having at least one access point capable of providing wireless connectivity to client devices, the access point having at least one client-serving access point radio transceiver capable of serving clients and at least one testing client transceiver positioned as a part of the access point and capable of creating wireless connections to access point transceivers in the network, the method comprising:
    sending and receiving wireless signals from the client-serving access point transceiver to serve clients;
    generating radio test signals for network testing from the at least one testing client transceiver at the at least one access point, including directing the radio test signals through an end-to-end connection towards one or more end points in the network, wherein the test signals measure the service quality of the network on at least one layer of the OSI layers L3-L7; and
    minimizing radio interference between signals of the client-serving radio transceiver and the testing client transceiver.

2. The method of claim 1 wherein the network has wireless traffic, and further wherein the minimizing of the radio interference is carried out by causing attenuation of the test signal off-band noise and interference level, with the attenuation being sufficient to reduce the of noise and interference to a level equal to or below the level of noise or interference resulting from the network traffic in the network.

3. The method of claim 1 where the at least one client-serving access point radio transceiver and the testing client transceiver use the same channel.

4. The method of claim 1 wherein the minimizing of the radio interference is carried out by using a channel for the client-serving access point radio transceiver that is different from the channel for the testing client transceiver.

5. The method of claim 1 where the minimizing of the radio interference is carried out by transmitting the radio test signals using an antenna that is not directly connected to the at least one access point and is connected to the at least one access point through RF connectivity.

6. The method of claim 1 where the minimizing of the radio interference is carried out by transmitting the radio test signals using the testing client transceiver and a connected antenna, with the testing client transceiver being powered by the at least one access point and being are connected to the at least one access point through a data connection.

7. The method of claim 1 where the minimizing of the radio interference is carried out by generating radio test signals for network testing with different wireless technology from the wireless technology used for connectivity from client-serving radio transceivers to end user devices.

8. The method of claim 1 where the minimizing of the radio interference is carried out by using digital or analog cancellation at the testing client transceiver, or the client-serving access point radio transceiver, or both the testing client transceiver and the client-serving access point radio transceiver.

9. The method of claim 1 where the client-serving access point radio transceiver and the testing client transceiver each have an antenna, and where the minimizing of the radio interference is carried out by using a directional antenna pattern for the testing client transceiver, or the client serving access point transceiver, or both the testing client transceiver and the client serving access point transceiver, to increase attenuation between the antennas.

10. The method of claim 1 in which the network through which the radio test signals are directed operates with a level of noise or interference resulting from other signals within the network, and in which the reduction in noise or interference between the client-serving radio signals and the radio test signals is sufficient to reduce the noise or interference to a level equal to or below the level of noise or interference resulting from the other signals in the network in the area.

11. The method of claim 1 in Which the minimizing of the radio interference is carried out by switching on and off the client-serving radio signals in an alternating arrangement with the radio test signals from the test interface to eliminate interference between the client-serving radio signals and the test signals.

12. The method of claim 1 in which the directing of the radio test signals is carried out by transmitting the radio test signals using an antenna that is spaced apart from the at least one access point by a distance within the range of from about 1 foot to about feet.

13. The method of claim 12 in which the directing of the radio test signals is carried out by transmitting the radio test signals using an antenna that is spaced apart from the access point by a distance within the range of from about 3 feet to about 6 feet.

14. The method of claim 1 where RF filtering is used to reduce noise or interference leakage between the client-serving radio transceiver and the test interface.

15. The method of claim 1 where the testing client transceiver is also capable of operating as a passive monitoring receiver.

16. A method for service quality monitoring in a wireless network, the network having both wired and wireless connections, the network having at least one access point capable of providing wireless connectivity to client devices, the access point having at least one client-serving access point radio transceiver and at least one antenna capable of serving clients and at least one testing client transceiver positioned as a part of the access point and capable of creating wireless connections to access point transceivers in the network, the method comprising:
    sending and receiving wireless signals from the client-serving access point radio transceiver and antenna to serve clients;
    generating radio test signals for network testing from the at least one testing client transceiver at the at least one access point, including transmitting the radio test signals through an end-to-end connection towards one or more end points in the network, where the transmitting of the radio test signals is carried out by using an antenna; and minimizing radio interference between signals of the client-serving radio transceiver and the radio test signals where the minimizing of radio interference is carried Out by spacing apart the testing client antenna and the access point antenna.

17. The method of claim 16 where the antenna is connected to the at least one access point using an RF cable.

18. The method of claim 16 where the client-serving access point radio transceiver and the testing client transceiver each have an antenna, and where the minimizing of the radio interference is carried out by using a directional antenna pattern for the testing client transceiver, or the client serving access point radio transceiver, or both the testing client transceiver and the client serving access point radio transceiver, to increase attenuation between the antennas.

19. A method for service quality monitoring in a wireless network, the network having both wired and wireless connections, the network having at least one access point capable of providing wireless connectivity to client devices, the access point having at least one client-serving access point radio transceiver and at least one antenna capable of serving clients and at least one testing client transceiver controlled by the access point and capable of creating wireless connections to access point transceivers in the network, the method comprising:

sending and receiving wireless signals from the client-serving access point radio transceiver and antenna to serve clients;

generating radio test signals for network testing from the at least one testing client transceiver, including transmitting the radio test signals through an end-to-end connection towards one or more end points in the network, where the transmitting of the radio test signals is carried out by using an antenna; and minimizing radio interference between signals of the client-serving radio transceiver and the radio test signals where the minimizing of radio interference is carried out by spacing apart the testing client transceiver and antenna from the access point antenna.

20. The method of claim 19 where the sending and receiving wireless signals from the client-serving access point radio transceiver to serve clients is carried out with a client serving antenna, and the minimizing of the radio interference is carried out by using a directional antenna pattern for the testing client transceiver or the client serving access point radio transceiver, or both the testing client transceiver and the client serving access point radio transceiver, to increase attenuation between the antennas.

21. The method of claim 19 where the testing client transceiver is connected to the at least one access point through a data connection.

22. The method of claim 19 in which the minimizing of the radio interference is carried out by switching on and off the client-serving radio signals in an alternating arrangement with the radio test signals from signals of the client serving access point radio transceiver to eliminate interference between the client-serving radio signals and the test signals.

* * * * *